United States Patent [19]

Oshiba et al.

[11] Patent Number: 5,402,399
[45] Date of Patent: Mar. 28, 1995

[54] APPARATUS AND METHOD FOR REPRODUCING INFORMATION DATA FROM OPTICAL CARDS

[75] Inventors: Mitsuo Oshiba; Takefumi Sakurada; Naoaki Tani; Takumi Sugaya; Takao Rokutan, all of Tokyo, Japan

[73] Assignee: Olympus Optical Co., Ltd., Tokyo, Japan

[21] Appl. No.: 103,964

[22] Filed: Aug. 9, 1993

[30] Foreign Application Priority Data

Aug. 31, 1992 [JP] Japan .................. 4-232481
Sep. 8, 1992 [JP] Japan .................. 4-239628

[51] Int. Cl.⁶ .................................. G11B 17/22
[52] U.S. Cl. ........................ 369/32; 369/44.28
[58] Field of Search ............ 369/32, 44.28, 15, 47, 369/48, 44.37, 44.27, 44.26, 112, 44.38, 14; 235/454

[56] References Cited

U.S. PATENT DOCUMENTS

| | | | |
|---|---|---|---|
| 4,598,393 | 1/1986 | Pierce et al. | 235/454 |
| 4,720,825 | 1/1988 | Kokado | 369/44.37 |
| 4,730,293 | 3/1988 | Pierce et al. | 235/454 |
| 4,787,075 | 11/1988 | Matsuoka et al. | 369/44.37 |
| 4,896,025 | 1/1990 | Hasegawa | 235/454 |
| 4,931,628 | 6/1990 | Wada | 235/454 |
| 4,982,391 | 1/1991 | Sakagami et al. | 369/47 |
| 5,008,521 | 4/1991 | Ohki et al. | 235/454 |
| 5,191,572 | 3/1993 | Tsutsui et al. | 369/44.38 |
| 5,237,556 | 8/1993 | Pierce | 369/112 |
| 5,247,504 | 9/1993 | Akatrsuka | 369/44.38 |
| 5,267,226 | 11/1993 | Matsuoka et al. | 369/44.37 |
| 5,274,615 | 12/1993 | Rokutan | 369/32 |
| 5,293,568 | 3/1994 | Oshiba et al. | 369/32 |

FOREIGN PATENT DOCUMENTS 63-37876 2/1988 Japan .
63-94438 4/1988 Japan .
2-227835 9/1990 Japan .

Primary Examiner—Robert J. Pascal
Assistant Examiner—Tan Dinh
Attorney, Agent, or Firm—Frishauf, Holtz, Goodman & Woodward

[57] ABSTRACT

In an optical card reproducing apparatus, the data of a front ID portion is read, and whether a track address can be identified is determined. If the track address cannot be identified, a flag is reset, and the data of a data portion is read. If the track address can be identified, whether the identified track address coincides with a target track address is determined. If they do not coincide, the operation is ended. If they coincide, the flag is set, and the data of the data portion is read. After the data read from the data portion is stored in a buffer memory, whether the flag is set is determined. If the flag is set, data in the buffer memory is output as the data of the target track. If the flag is reset, the data of a rear ID portion is read, and whether the track address is identified is determined. If the track address cannot be identified, the buffer memory is cleared, and the operation is ended. If the track address can be identified, whether the identified track address coincides with the target track address is determined. If they do not coincide, the buffer memory is cleared, and the operation is ended. If they coincide, data in the buffer memory is output as the data of the target track.

16 Claims, 10 Drawing Sheets

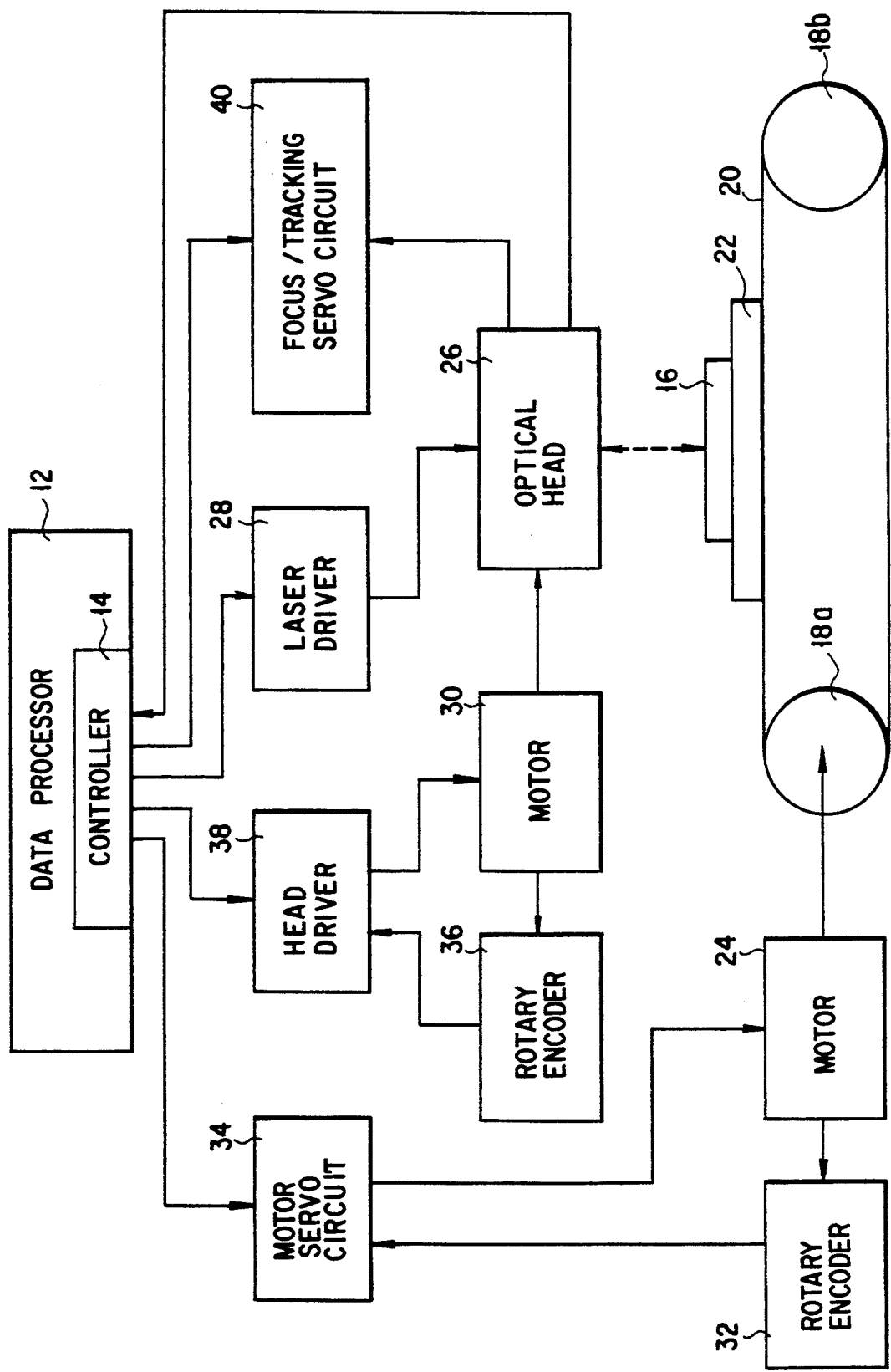
F I G. 4

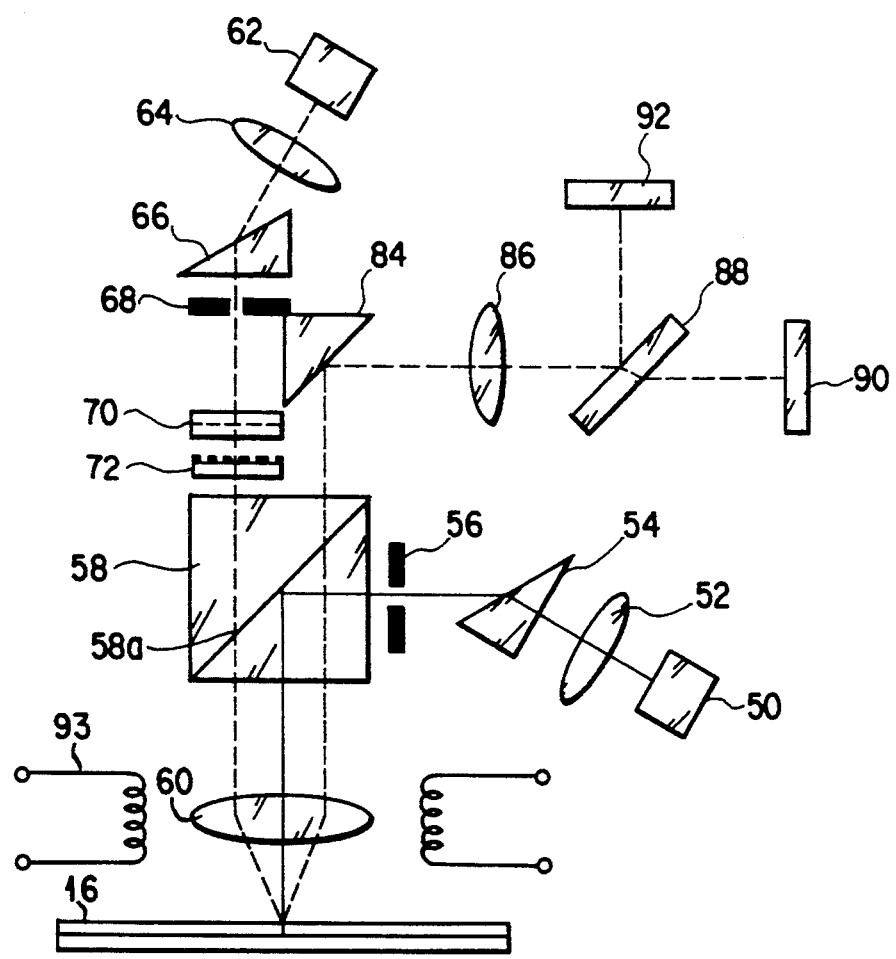
F I G. 5

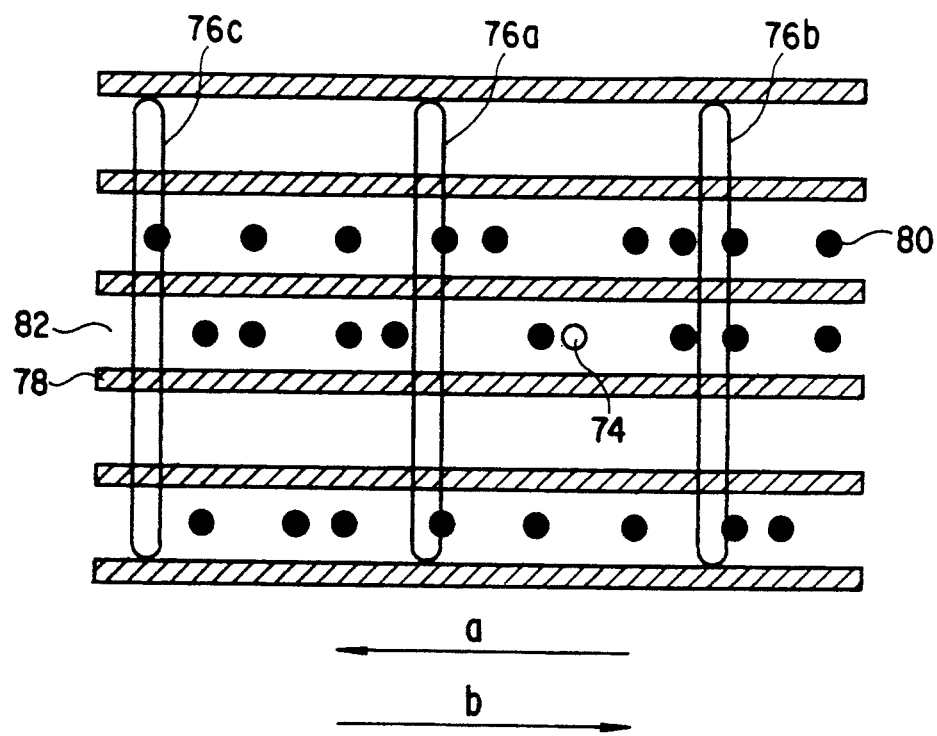
F I G. 6
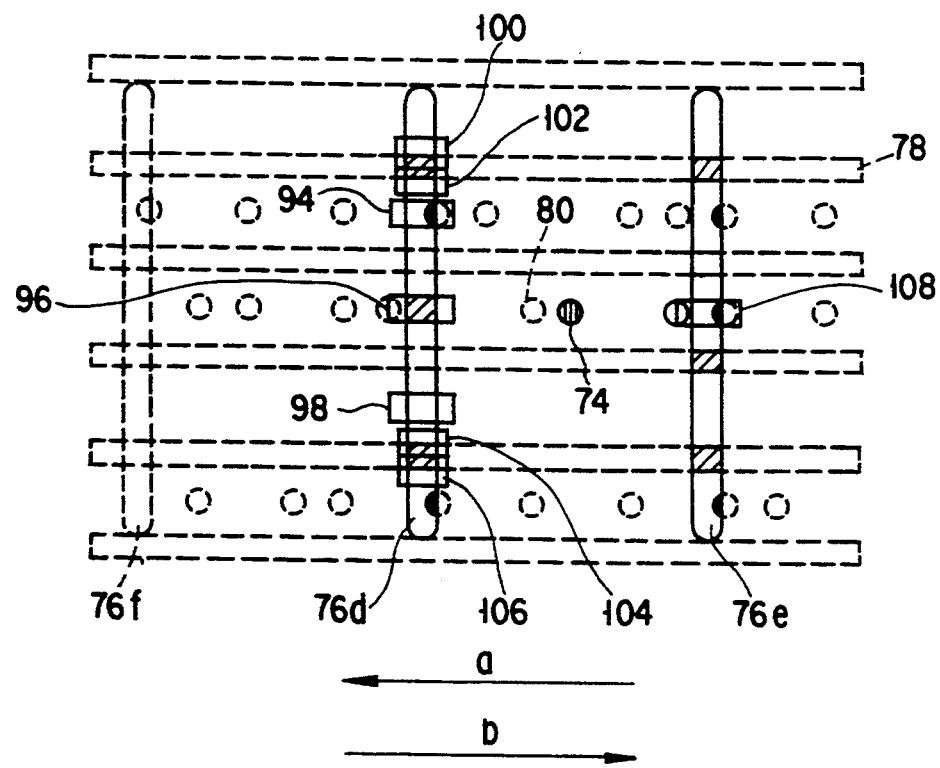
F I G. 7

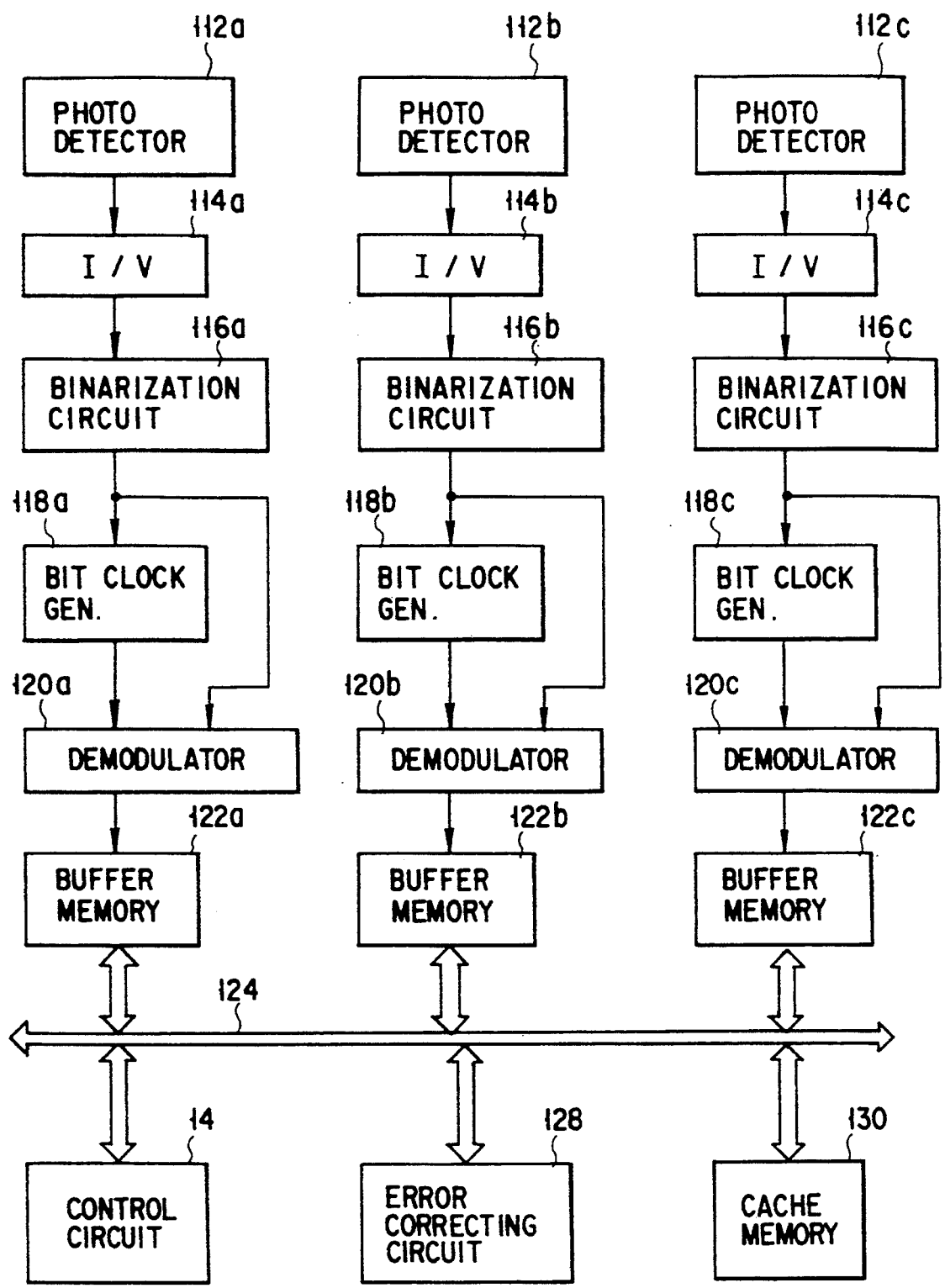
F I G. 11

APPARATUS AND METHOD FOR REPRODUCING INFORMATION DATA FROM OPTICAL CARDS

BACKGROUND OF THE INVENTION

1. Field of the Invention

The present invention relates to an apparatus for optically reproducing data from, e.g., a card- or disk-like optical data recording medium.

2. Description of the Related Art

An optical card is known as an example of such a recording medium. An example of the optical card is described in Published Unexamined Japanese Patent Application No. 63-37876 filed by the assignee of the present invention. FIG. 1 shows this optical card.

An optical recording portion 4 comprising a plurality of parallel tracks 4a is formed on the upper surface of an optical card 2 having a shape similar to that of a credit card or the like. Data can be recorded by forming data pits in the tracks 4a, or be reproduced by reading the data pits formed in the tracks 4a. Data is written or read by scanning a light beam emitted from an optical head (not shown) onto the tracks 4a. Scanning is normally performed by repeatedly moving the optical card 2 in the direction of tracks. Therefore, the scanning directions are sometimes opposite between write and read operations. In this case, the readout data train of one track is inverted in the direction of time axis by using a buffer memory, so that data can be correctly read.

ID portions 6a and 6b are formed on the two end portions of each track 4a to record data (ID data) indicating a track address corresponding to this track 4a. The end portions of the tracks 4a have a low reliability since they can be easily damaged or soiled. Therefore, the ID portions 6a and 6b are formed at positions inward from the card ends at predetermined distances (e.g., 4 mm). This also aims at sufficiently stabilizing the relative moving speed of the optical card 2 and the optical head (light beam). A portion between the two ID portions 6a and 6b forms a data portion 8 for recording data. As described above, scanning is performed by reciprocal conveyance of the card, and data is reproduced in the two directions. Hence, the ID portions 6a and 6b are formed on the two sides of the data portion 8 so that the track address can be read from either side. For this purpose, when the light beam is moving from, e.g., the left to the right in FIG. 1, the ID portion 6a on the left side is read; when the light beam is moving from the right to the left, the ID portion 6b on the right side is read, thereby recognizing the track address. In this manner, the ID data can be read regardless of the scanning direction before the data portion 8 is read.

The conventional optical card data reproducing apparatus described above is of a single track read type which reads data in units of tracks by radiating a light beam emitted from the optical head onto only a single track.

However, in such a single track read type apparatus, the reproducing speed of data recorded on the track is determined by the relative speed of the optical head and the recording medium and cannot be freely increased.

In order to solve this drawback, a simultaneous read type reproducing apparatus for simultaneously reading a plurality of tracks is proposed. According to this apparatus, a beam emitted from an optical head is radiated on a plurality of tracks, thereby reading data from the plurality of tracks simultaneously.

For example, U.S. Pat. application No. 904,036 (filed Jun. 25, 1992) filed by the same assignee as that of the present invention discloses such a multi-track read type apparatus. In this apparatus, data reproducing means each comprising a data reproducing photodetector, a binarization circuit, a bit clock generator, a demodulator, and a buffer memory are provided in a number corresponding to the number of a plurality of tracks that are to be read simultaneously. Therefore, when data is to be read from the optical card, processing of binarization, demodulation, and memory storage is executed for the plurality of tracks simultaneously in a parallel manner. After the optical head passes the data portion 8, the errors of the demodulated data stored in the memory are sequentially corrected by an error correcting means. Then, even when the relative speed of the optical head and the recording medium is high, the data read speed can be increased. A simultaneous read type apparatus of this type for reading a plurality of tracks simultaneously can also be used as a single track read type apparatus.

Generally, in the optical card 2 shown in FIG. 1, each of the ID portions 6a and 6b includes, i.e., five items of ID data ID0 to ID4. The ID data ID0 to ID4 include the same track address data and are usually subjected to error correction encoding.

In the data recording/reproducing apparatus for an optical card, for example, when a read access request from a host computer to which this apparatus is connected designates a track address, a track at an estimated position is scanned to read its address. If this address coincides with the address of the target track, the readout data is fetched. If this address does not coincide with the address of the target track, this scanning is nullified, and the target track is read in the subsequent scanning operation. This procedure also applies to the data write operation.

In this data recording/reproducing apparatus, erroneous track address recognition leads to damaging already recorded data or reading erroneous data. Therefore, a probability of erroneous track address recognition must be minimized as much as possible. For this purpose, five items of ID data ID0 to ID4 are recorded on each of the ID portions 6a and 6b. The track address is determined based on the read result of the five items of ID data ID0 to ID4, thereby suppressing the probability of erroneous recognition.

In the data reproducing apparatus using this optical card 2, recording/reproduction of data is generally performed by reciprocally moving the optical card and the optical head in the direction of tracks relative to each other. The moving speed (i.e., the relative speed of the optical head and the optical card in the scanning operation of the light beam) in the reciprocal movement will be briefly described with reference to FIG. 3.

Assume that the optical head is located on the left side of the ID portion 6a of FIG. 1. One scanning operation is started at time 0, and the scanning speed is increased so that the relative speed (scanning speed) of the optical head and the optical card becomes a predetermined constant speed before the optical head reaches the start position of the left ID portion 6a (time t1).

When the optical head reaches the ID portion 6a, the scanning speed becomes the constant speed, the ID portion 6a is read, and thus the track address is confirmed. Thereafter, scanning of the data portion 8 is started and the optical head accesses the data portion 8. When the optical head passes by the right ID portion 6b (time t2), the scanning speed is started to be decreased so as to stop the scanning operation. When a predetermined setting time has lapsed after time t3 at which the reciprocal movement of the optical head and card is stopped, the subsequent scanning operation in the opposite direction is started at time t4.

In this manner, the optical head and card are reciprocally moved relative to each other in the direction of tracks to move the light beam to be radiated on the optical card along the track, thereby recording/reproducing data.

As described above, in the conventional optical card recording/reproducing apparatus, an ID portion (the ID portion 6a in the case of FIG. 3) appearing immediately before accessing the data portion 8 is read, as shown in FIG. 3. The track address of the track which is being scanned is identified from the content of this ID portion. It is recognized that a data portion following this ID portion is the area corresponding to a desired track address. Then, data recording/reproduction is performed.

At this time, all the contents of the plurality of items of ID data ID0 to ID4 that are read when the ID portion 6a or 6b is scanned are subjected to error correction encoding to reproduce the corresponding track address data (track number). If the same track address data can be reproduced from all items of the ID data, the data portion 8 is reproduced. If the same track address data cannot be reproduced, the data portion 8 is not reproduced.

More specifically, in the conventional apparatus, when the ID portion 6a or 6b cannot be read at all due to dust or scratches, or when even at least one ID data, of the five items of ID data written on the ID portion, cannot be read correctly, it is determined that the probability of erroneous track address recognition is high, and the data portion is not reproduced.

Even in this case, however, regarding the relative scanning operation of the optical card and head, a normal scanning operation similar to that shown in FIG. 3 is executed so that the next scanning operation is performed from the opposite side. In the next scanning operation from the opposite side, the ID portion 6b is read from the right side of the optical card 2 shown in FIG. 1. The track address is recognized from the content of the ID portion 6b. If the track address is normally recognized, the data portion is reproduced.

Thus, in conventional data reproduction from an optical card, while the normal reciprocal scanning operation of the tracks is repeated, the track address is identified from an ID portion appearing before reading the data portion. If a track address can be identified, the following data portion is read. If the track address cannot be identified, or when it is determined that the probability of erroneous recognition is high, the readout data is not fetched, and this one scanning operation is nullified.

This wasteful scanning prevents the improvement of data read efficiency. Considering that the optical card is a medium capable of handling a great deal of data, it is an important problem to improve an efficiency of reading data.

Furthermore, even when the track address is identified, if this track address is different from that of a target track which is requested to be accessed, this scanning operation is nullified at all, and readout data obtained by this scanning is not utilized.

SUMMARY OF THE INVENTION

It is an object of the present invention to provide a reproducing apparatus having an increased processing efficiency, in which when a recording address is to be identified in reproduction of an optical recording medium, wasteful access to the recording medium is eliminated by effectively identifying the address.

It is another object of the present invention to provide a reproducing apparatus having an increased processing efficiency, in which even if an address other than a target address is erroneously accessed, data read by this access is prevented from being wasted, so that a read efficiency and an access speed are increased, thereby increasing the processing efficiency.

According to the present invention, there is provided an apparatus for reproducing data from an optical data recording medium, the apparatus comprising:
  memory means for storing data read from the optical data recording medium together with an address of the read data;
  means for determining whether data at a target address which is to be reproduced is stored in the memory means;
  first reading means for, when the determining means determines that the data is stored in the memory means, reading data from the memory means; and
  second reading means for, when the determining means determines that the data is not stored in the memory means, accessing the target address of the optical data recording medium to read data.

According to the present invention, there is provided a method of reproducing data from an optical data recording medium having a large number of parallel linear recording tracks, each of the tracks having a data recording area and two address recording areas for recording an address thereof at two ends of the data recording area, the method comprising the following steps of:
  accessing one of the address recording areas and determining whether an address can be correctly read;
  reading data from the data recording area regardless of a determination result by the accessing step; and
  when an address cannot be correctly read from the one address recording area, accessing the other address recording area.

According to the present invention, there is provided another apparatus for reproducing data from an optical data recording medium having a large number of parallel linear recording tracks, each of the tracks having a data recording area and two address recording areas for recording an address thereof at two ends of the data recording area, the apparatus comprising:
  first reading means for continuously accessing one of the two address recording areas and the data recording area;
  first determining means for determining whether an address can be identified from data read from the one of the two address recording areas;
  second determining means for, when the first determining means can identify the address, determining whether the identified address is a target address which is to be reproduced;
  a buffer memory for storing data read from the data recording area;

means for, when the second determining means determines that the identified address is the target address, outputting a content of the buffer memory;

second reading means for, when the first determining means cannot identify the address or the second determining means determines that the identified address is not the target address, accessing the other of the two address recording areas after the first reading means performs an access operation;

third determining means for determining whether or not an address can be identified from data read from the other of the two address recording areas;

fourth determining means for, when the third determining means can identify the address, determining whether the identified address is the target address;

means for, when the fourth determining means determines that the identified address is the target address, outputting a content of the buffer memory; and means for, when the third determining means cannot identify the address or the fourth determining means determines that the identified address is not the target address, clearing the content of the buffer memory.

According to the present invention, there is provided a still another apparatus for reproducing data from an optical data recording medium having a large number of parallel linear recording tracks, each of the tracks having a data recording area and two address recording areas for recording an address thereof at two ends of the data recording area, the apparatus comprising:

first reading means for continuously accessing one of the two address recording areas and the data recording area of a plurality of tracks;

first determining means for determining whether addresses can be identified from data read from the one of the two address recording areas;

second determining means for, when the first determining means can identify the addresses, determining whether the identified addresses include a target address which is to be reproduced;

a buffer memory for storing data read from the data recording area;

means for, when the second determining means determines that the identified addresses includes the target address, outputting data of the target address from the buffer memory;

second reading means for, when the first determining means cannot identify the addresses or the second determining means determines that the identified addresses do not include the target address, accessing the other of the two address recording areas of each of the plurality of tracks after the first reading means performs an access operation;

third determining means for determining whether addresses can be identified from data read from the other of the two address recording areas;

fourth determining means for, when the third determining means can identify the addresses, determining whether the identified addresses include the target address;

means for, when the fourth determining means determines that the identified addresses include the target address, outputting data of the target address from the buffer memory; and means for, when the third determining means cannot identify the addresses or the fourth determining means determines that the identified addresses do not include the target address, clearing a content of the buffer memory.

According to the present invention, data which is once read from an optical data recording medium is stored in memory means together with its address. When a reproduction request is sent, it is determined whether or not data at an address corresponding to this reproduction request is present in the memory means. If it is not present, the optical data recording medium is accessed in the normal manner. If it is present, the optical data recording medium is not accessed, but data is read out from the memory means. Even when the accessed address is different from the target address, the readout data is stored in the memory means. Therefore, this access is not wasted to increase the read efficiency and access speed, thereby increasing the processing efficiency.

Furthermore, according to the present invention, even when the address cannot be identified from the data read from one identification area before the data is accessed, the data is read, and thereafter the address is identified based on the data read from the other identification area. As a result, the read efficiency and access speed can be increased, thereby increasing the processing efficiency.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is the block diagram of an optical data reproducing apparatus according to a first embodiment of the present invention;

FIG. 5 is a view showing the structure of an optical head of the first embodiment;

FIG. 6 is a view showing the positional relationship, on the optical card, between recording light beam spot and spots formed by the diffracted light of a reproducing light beam formed on the optical card;

FIG. 7 is a view showing the positional relationship between the spot images of the recording light beam and spot images formed by the diffracted light of the reproducing light beam projected on a photodetector;

FIG. 11 is a block diagram of the data processor of a third embodiment;

DETAILED DESCRIPTION OF THE PREFERRED EMBODIMENTS

Figure 1:
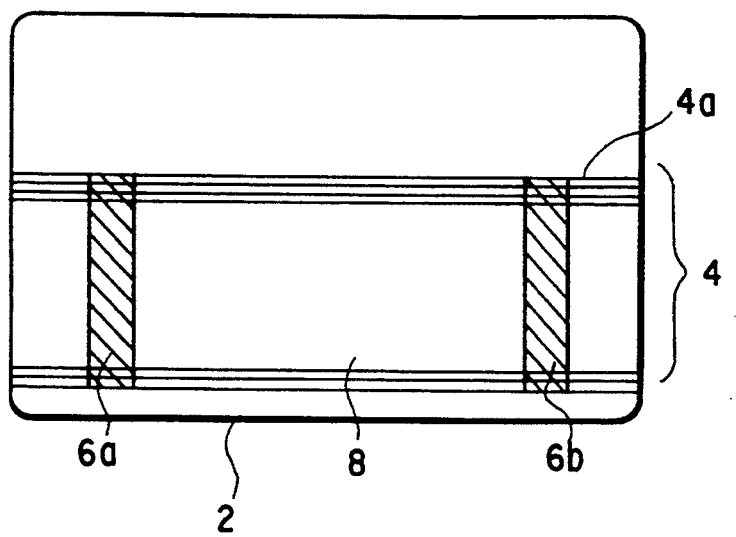
FIG. 1 is a plan view of a conventional optical card.
Figure 2:
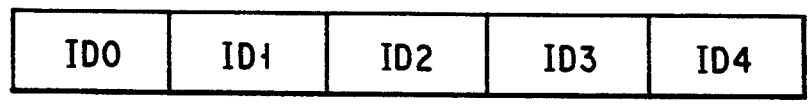
FIG. 2 is a view for explaining the structure of the ID portion of each track of the optical card.

A preferred embodiment of an optical data reproducing apparatus according to the present invention will now be described with reference to the accompanying drawings.

FIG. 4 is a block diagram schematically showing the 10 structure of an apparatus for optically reproducing data of an optical card. A data processor 12 manages the various types of required control operations of the whole system and has a controller 14 for controlling each of the elements that are to be controlled. The data processor 12 performs data write and processes readout data. Write data and the readout data may be exchanged with an external host system, or the data processor 12 itself may have an input/output means.

When an optical card 16 is inserted in the apparatus main body through an insertion port formed in a housing (not shown), the optical card 16 is loaded on a conveyor table 22 provided at a predetermined position on a conveyor belt 20 applied between a pair of pulleys 18a and 18b that are arranged at a predetermined distance.

The optical card 16 has the same structure as that shown in FIG. 1 and has a data recording portion 4 in which a plurality of tracks 4a are arranged. ID portions 6a and 6b are arranged in the vicinities of the two ends of each track 4a. A data portion 8 is arranged in the area sandwiched between the ID portions 6a and 6b.

A motor 24 is connected to the pulley 18a. When the motor 24 is controlled to rotate in the clockwise/counterclockwise direction, the pulley 18a is rotated in the clockwise/counterclockwise direction. When the pulley 18a is rotated in the clockwise/counterclockwise direction, the conveyor belt 20 is moved in the forward-/reverse direction, thereby reciprocally moving the conveyor table 22. Then, the optical card 16 loaded on the conveyor table 22 can be repeatedly moved in the direction of tracks.

The apparatus main body has an optical head 26 for recording or reading data by radiating a light beam on the tracks of the optical card 16. The optical head 26 is connected to a laser driver 28. The laser driver 28 drives a semiconductor laser provided in the optical head 26 for generating the light beam, and is connected to the controller 14. The controller 14 controls to drive the semiconductor laser, thereby controlling radiation of the light beam emitted from the optical head 26 onto the optical card 16. The optical head 26 is arranged at a position above, e.g., the central position of an area (between the pulleys 18a and 18b) where the conveyor belt 20 is disposed. The optical head 26 is connected to a motor 30. When the motor 30 is driven, the optical head 26 can be moved in a direction perpendicular to the moving direction of the conveyor belt 20, i.e., in a direction across the tracks of the optical card 16 loaded on the conveyor table 22.

With this structure, when the motor 24 is driven, the optical card 16 is reciprocally conveyed in the direction of tracks, and when the motor 30 is driven, the optical head 26 is reciprocally moved in a direction perpendicular to the tracks. Hence, when the optical head 26 and the optical card 16 are moved relative to each other, each track of the optical card 16 can be scanned by the optical head 26.

The motor 24 is connected to a rotary encoder 32 for detecting the position of the conveyor table 22 with respect to the optical head 26. The rotary encoder 32 generates a pulse at every predetermined rotational angle. One pulse of the rotary encoder 32 corresponds to, e.g., the relative moving amount of 50 μm of the conveyor table 22 with respect to the optical head 26.

Figure 3:
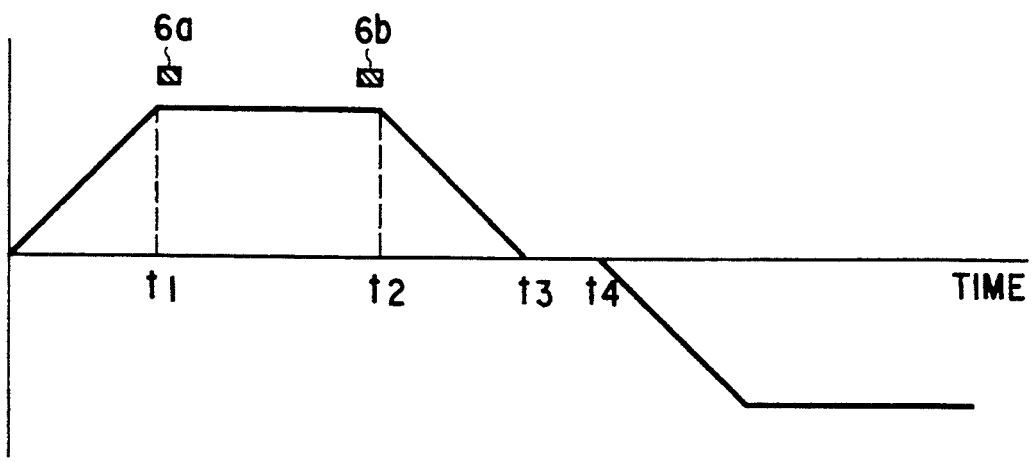
FIG. 3 is a view for explaining a change in scan speed which accompanies the reciprocal movement of the optical card.

The motor 24 is controlled by a motor servo circuit 34. The motor servo circuit 34 is connected to the rotary encoder 32 and the controller 14. The motor servo circuit 34 detects the convey speed of the optical card 16 based on the positional data sent from the rotary encoder 32 and controls the rotational speed of the motor 24. In this case, a control command is sent from the controller 14 to the motor servo circuit 34 so that the convey speed becomes a constant speed as shown in FIG. 3 in the range from the ID portions 6a to 6b, in FIG. 1, of the optical card 16, and the rotational speed of the motor 24 is controlled based on the convey speed of the optical card 16.

The motor 30 connected to the optical head 26 is connected to a rotary encoder 36 for detecting the position of the optical head 26 with respect to (the tracks of) the optical card 16 in a manner similar to that of the motor 24. The motor 30 and the rotary encoder 36 are connected to an optical head driver 38, and the motor 30 is controlled by the optical head driver 38. The optical head driver 38 is connected to the controller 14. A control command is sent from the controller 14 to the optical head driver 38 based on the positional data and the like sent from the rotary encoder 36, thereby controlling the motor 30.

A focus/tracking servo circuit 40 is provided in the apparatus and connected to the optical head 26 and the controller 14. The focus/tracking servo circuit 40 drives the optical head 26 in the focusing direction and a direction perpendicular to the tracks based on a focus error signal and a tracking error signal generated by the light beam reflected by the optical card 16. Then, the incident light always traces the target track of the optical card 16 in the in-focus state.

A structure of the optical head 26 used by the optical card data reproducing apparatus described above, the positional relationship between the recording and reproducing light beam spots formed on the optical card 16 by the optical head 26, and the spot images of the recording and reproducing light beams projected on the photodetector in the optical head 26 will be described with reference to FIGS. 5 to 7. FIG. 5 is a view showing a structure of the optical head 26 provided in the optical card data reproducing apparatus. FIG. 6 is a view showing the positional relationship between the recording and reproducing light beam spots formed on the optical card 16. FIG. 7 is a view showing the spot images of the recording and reproducing light beams projected on the photodetector in the optical head 26.

As shown in FIG. 5, a semiconductor laser 50 serving as a data recording light source is provided to the optical head 26. The semiconductor laser 50 generates a laser beam upon reception of a drive signal from the laser driver 28 that operates under the control of the controller 14. The light beam generated by the semiconductor laser 50 is collimated to a parallel beam having a substantially elliptic section by a collimator lens 52. The parallel beam is shaped by a shaping prism 54 to have a substantially circular section as only the short-axis component of the ellipse is enlarged. Thereafter, the diameter of the parallel beam is reduced by a circular stop 56 such that the spot of the parallel beam has a predetermined size on the recording medium (the optical card 16). Then, the parallel beam is incident on a polarization beam splitter 58.

Since the recording light beam mostly consists of S-polarized light components due to the nature of the semiconductor laser 50, most components of the beam are reflected by a reflecting surface 58a of the polarization beam splitter 58 and incident on the optical axis of an objective lens 60. This light beam is focused by the objective lens 60 to form a circular spot on the optical card 16. Then, the energy density of the optical card 16 is locally increased to cause a thermally irreversible change in recording layer (data portion 8) of the optical card 16, thereby forming a recording pit.

The objective lens 60 is driven by an objective lens driving means 93 so as to be brought close to or separated from the card on the basis of a focus error signal, and focusing control is performed such that the light beam is kept in an in-focus state on the card 16. The objective lens 60 is driven by the objective lens driving means 93 in the direction perpendicular to the tracks on the basis of a tracking error signal, and tracking control is performed such that the light beam is kept at center of the track.

A semiconductor laser 62 is provided as the data reproducing light source independently of the semiconductor laser 50. A light beam generated by the semiconductor laser 62 passes through a collimator lens 64 to be collimated to a parallel beam having a substantially elliptic section. Then, this parallel beam is shaped by a shaping prism 66 to have a substantially circular section as only the short-axis component of the ellipse is enlarged. Thereafter, the diameter of this parallel beam having the circular section is further reduced by a circular stop 68 such that the spot of the parallel beam has a predetermined size on the recording medium. Then, the parallel beam is incident on a plano-concave cylindrical lens 70.

This reproducing light beam is refracted only in a plane perpendicular to the optical axis by the plano-concave cylindrical lens 70 so that the light beam slightly diverges in this direction. Furthermore, the light beam is divided into a 0th-order diffracted beam and two first-order diffracted beams by a diffraction grating 72. At this time, assume that the plano-concave cylindrical lens 70 and the diffraction grating 72 are disposed at such positions that the diverging direction of the light beam diverged by the plano-concave cylindrical lens 70 and the diffracting direction of the light beam diffracted by the diffraction grating 72 are substantially orthogonal.

Since the three light beams divided by the diffraction grating 72 mostly consist of P-polarized components due to the nature of the semiconductor laser 62, most components of the beams pass through the polarization beam splitter 58 and are incident on the objective lens 60. These light beams are focused by the objective lens 60 to form three spots as images on the optical card 16. Since the light beam is diverged in one direction by the plano-concave cylindrical lens 70, the respective light beam spots are enlarged in the diverging direction to form elliptic spots on the optical card 16.

FIG. 6 shows the positional relationship between the recording and reproducing light beam spots formed on the optical card 16.

A recording light beam spot 74 is formed to be located either between a spot 76a formed by the 0th-order diffracted light of the reproducing light beam and a spot 76b formed by the first-order diffracted light of the reproducing light beam, or between the spot 76a and a spot 76c formed by the first-order diffracted light of the reproducing light beam. The layout of the respective spots is adjusted by imparting a relative angular difference between the optical axis of the recording light beam and that of the reproducing light beam before being incident on the objective lens 60 when the optical head is assembled and adjusted. The cylindrical lens 70 is disposed such that the enlarging direction of the reproducing light beam spots 76a, 76b, and 76c on the optical card 16 is substantially perpendicular to the extending direction of the tracks. Therefore, each of the elliptic reproducing light beam spots 76a, 76b, and 76c is distributed across the plurality of tracks, and data of the plurality of tracks can be simultaneously reproduced.

The spots 76a, 76b, and 76c formed by the diffracted light of the reproducing light beam are regularly reflected by the optical card 16 as their amounts of light are modulated by track guides 78 and the presence/absence of a data pit 80 on the optical card 16. Each track guide 78 is provided between adjacent tracks 82. The tracks 82 are areas having a high reflectance, while the track guides 78 and the pits 80 are areas having a low reflectance. These reflected light beams pass through the objective lens 60 and are guided to the polarization beam splitter 58 as substantially parallel light. Since the reflected light is regularly reflected by the optical card 16, it substantially has the P-polarized components, and most components are guided to a reflecting mirror 84 through the polarization beam splitter 58. Then, after the reflected light is reflected by the reflecting mirror 84, it is focused by a condenser lens 86 and split by a half mirror 88. The split light components are incident on either the light-receiving surface of a signal reproducing/tracking photodetector 90 and the light-receiving surface of a focusing photodetector 92 to enlarge and project the spot images.

At this time, since the reproducing light beam is incident on a position of the objective lens 60 which is offset from the optical axis, so-called off-axis focus detection is performed. The focusing photodetector 92 has, e.g., two-divided photodetectors for detecting the movement of the image of the reproducing light beam spot caused by a focusing error. Then, a focusing error signal corresponding to the focusing error is generated.

FIG. 7 shows the spot image of the recording light beam and the spot images of the diffracted reproducing light beams that are projected on the signal reproducing/tracking photodetector 90.

Signal reproducing photodetector elements 94, 96, and 98 and tracking photodetector elements 100, 102, 104, and 106 are arranged on the photodetector 90. In addition, a signal reproducing photodetector element 108 is provided to the photodetector 90 at a position where an image 76e corresponding to the spot 76b of the first-order diffracted beam is formed when images 76d, 76e, and 76f as the enlargingly projected images of the reproducing light beams are formed at appropriate positions on these photodetector elements without tracking and focusing errors.

The tracking photodetector elements 100 and 102, and 104 and 106 detect a positional change in images of the track guides 78 caused by a tracking error as a change in amounts of received light, and generate tracking error signals. The signal reproducing photodetector elements 94, 96 (or 108), and 98 detect the presence/absence of data pits of three tracks from a change in amounts of light, and output reproduction signals.

In data recording, when the optical card 16 moves in the direction of an arrow a (forward direction), as shown in FIG. 6, the data pits 80 formed by the recording light beam spot 74 are moved toward the spot 76c formed by one first-order diffracted reproducing light beam. When the data pits 80 reach the position of the spot 76a, a change in amount of light is caused in the signal reproducing photodetector element 96 on the photodetector 90, and a reproduction signal is output. Therefore, a reproduction signal immediately after recording can be obtained, and verification is performed based on this reproduction signal to check if recording is performed with or without an error.

When the moving direction of the optical card 16 is reversed so that the optical card 16 moves in the direction of an arrow b (reverse direction), the data pits 80 formed by the recording light beam spot 74 are moved toward the spot 76b formed by the other first-order diffracted reproducing light beam. When the data pits 80 reach the position of the spot 76b, a change in amount of light is caused in the signal reproducing photodetector element 108, and a reproduction signal immediately after recording can be obtained from this change in amount of light. Then, verification is performed based on this reproduction signal.

Hence, a reproduction signal can be obtained immediately after recording even when the optical card 16 is moved in the forward or reverse direction. In other words, a reproduction signal can be obtained immediately after recording regardless of the moving direction of the optical card 16 that is reciprocally moved with respect to the optical head 26, and verification can be performed to check if recording is performed with or without an error.

Figure 8:
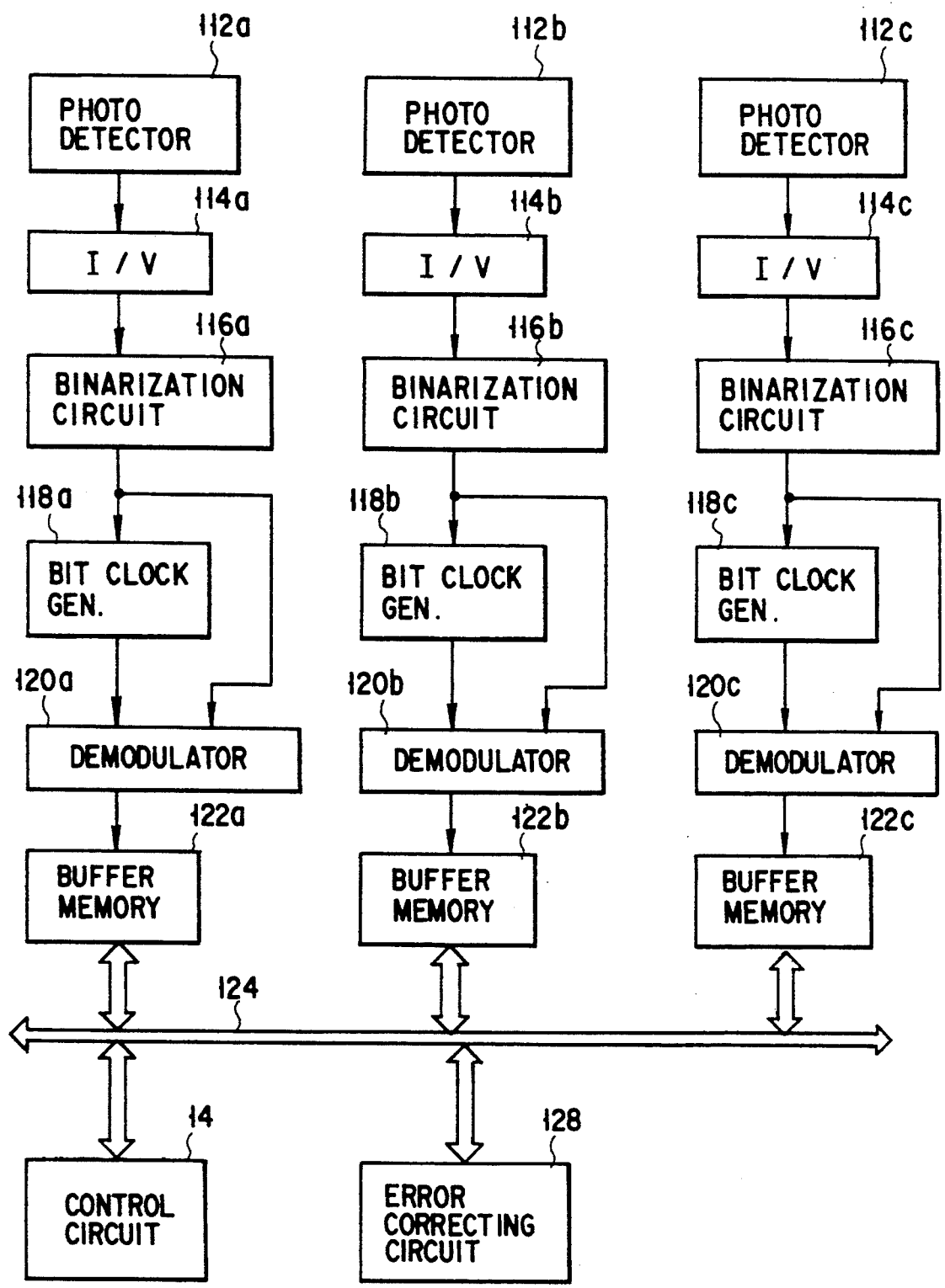
FIG. 8 is a block diagram of the data processor of the first embodiment.

The data processor 12 shown in FIG. 4 will be described. FIG. 8 shows the structure of the data processor 12 in detail. This embodiment exemplifies a case wherein three tracks can be simultaneously read. However, the multi-track number is not limited to three. Signal reproducing photodetector elements 112a, 112b, and 112c are provided on the photodetector 90. These photodetector elements correspond to the signal reproducing photodetector elements 94, 96, and 98 in FIG. 7.

I/V converters 114a, 114b, and 114c are provided to the data processor 12. Outputs from the signal reproducing photodetector elements 112a, 112b, and 112c are respectively supplied to the I/V converters 114a, 114b, and 114c. The I/V converters 114a, 114b, and 114c current/voltage-convert the signals received by the signal reproducing photodetector elements 112a, 112b, and 112c. Binarization circuits 116a, 116b, and 116c are connected to the output terminals of the I/V converters 114a, 114b, and 114c. The binarization circuits 116a, 116b, and 116c respectively convert the outputs from the I/V converters 114a, 114b, and 114c to binary signals using predetermined threshold levels, and output the binary signals to demodulators 120a, 120b, and 120c and bit clock generators 118a, 118b, and 118c.

The bit clock generators 118a, 118b, and 118c respectively generate bit clocks based on the binary signals output from the corresponding binarization circuits 116a, 116b, and 116c, and supply the bit clocks to the demodulators 120a, 120b, and 120c. The demodulators 120a, 120b, and 120c respectively sample the binary signals output from the binarization circuits 116a, 116b, and 116c upon reception of the bit clocks from the bit clock generators 118a, 118b, and 118c, and demodulate data based on the sampling results.

Buffer memories 122a, 122b, and 122c for storing demodulation results output from the corresponding demodulators 120a, 120b, and 120c are connected to the output terminals of the demodulators 120a, 120b, and 120c. The buffer memories 122a, 122b, and 122c store data before error correction in units of tracks.

The buffer memories 122a, 122b, and 122c are connected to a data bus 124, and the controller 14 and an error correcting circuit (ECC) 128 for performing error correction are connected to the data bus 124. The error correcting circuit 128 corrects errors of data stored in the buffer memories 122a, 122b, and 122c. Data after error correction may be stored again in the buffer memories 122a, 122b, and 122c, or be sent to the outside through the data bus 124. The controller 14 performs various types of required control operations for the error correcting circuit 128 and the buffer memories 122a, 122b, and 122c through the data bus 124, and usually comprises a CPU.

One track of an optical card has a capacity of about 2 KB including a redundant byte for an error correcting code. Hence, it is effective and optimum in terms of the cost, availability of the memory element, access speed, and the like to choose an SRAM (Static Random Access Memory) of about 4 K×8 bits as each of the buffer memories 122a, 122b, and 122c.

The operation of the optical card data reproducing apparatus of this embodiment will be described.

To reproduce data, the optical card 16 is loaded on the conveyor table 22, and the optical head 26 and the optical card 16 are moved relative to each other. Then, the light beam from the optical head 26 is scanned along the tracks to write/read data.

Upon reception of an address of a target track to be accessed, the controller 14 calculates an amount of movement of the optical head 26 from the current position of the optical head 26 and the position of the target track to be read, and sends a command to the optical head driver 38, so that the motor 30 is driven to move the optical head 26 in a direction perpendicular to the tracks of the optical card 16. Then, the controller 14 sends a command to the motor servo circuit 34. The motor 24 is driven to move the conveyor table 22 between the pulleys 18a and 18b so as to move the optical card 16 in the direction of tracks with respect to the optical head 26, thereby scanning the target track with the light beam.

The operation so far is the same as that of a conventional optical card reproducing apparatus, and is called a seek operation.

To record data, a write signal modulated on the basis of the write data is supplied from the controller 14 to the laser driver 28. Then, the recording semiconductor laser 50 of the optical head 26 is driven to emit a recording light beam, thereby forming a data pit 80 in a track of the optical card 16.

To reproduce data, the reproducing semiconductor laser 62 of the optical head 26 is driven to radiate a reproducing light beam on the optical card 16. Light reflected by the optical card 16 is received by the signal reproducing photodetector 90 of the optical head 26 to read recorded data from the intensity of the reflected light. The readout signal is demodulated by the demodulators 120a, 120b, and 120c in the data processor 12 in units of tracks and stored in the buffer memories 122a, 122b, and 122c in the data processor 12.

At this time, note that focus control and tracking control is performed by the focus/tracking servo circuit 40 and the focus/tracking actuator 93 (FIG. 5) provided to the optical head 26 so that the light beam traces the target track in the in-focus state.

The reproducing operation will be described in detail with reference to the flow chart of FIG. 9. All the processing operations of FIG. 9 are executed by the controller 14.

Figure 9:
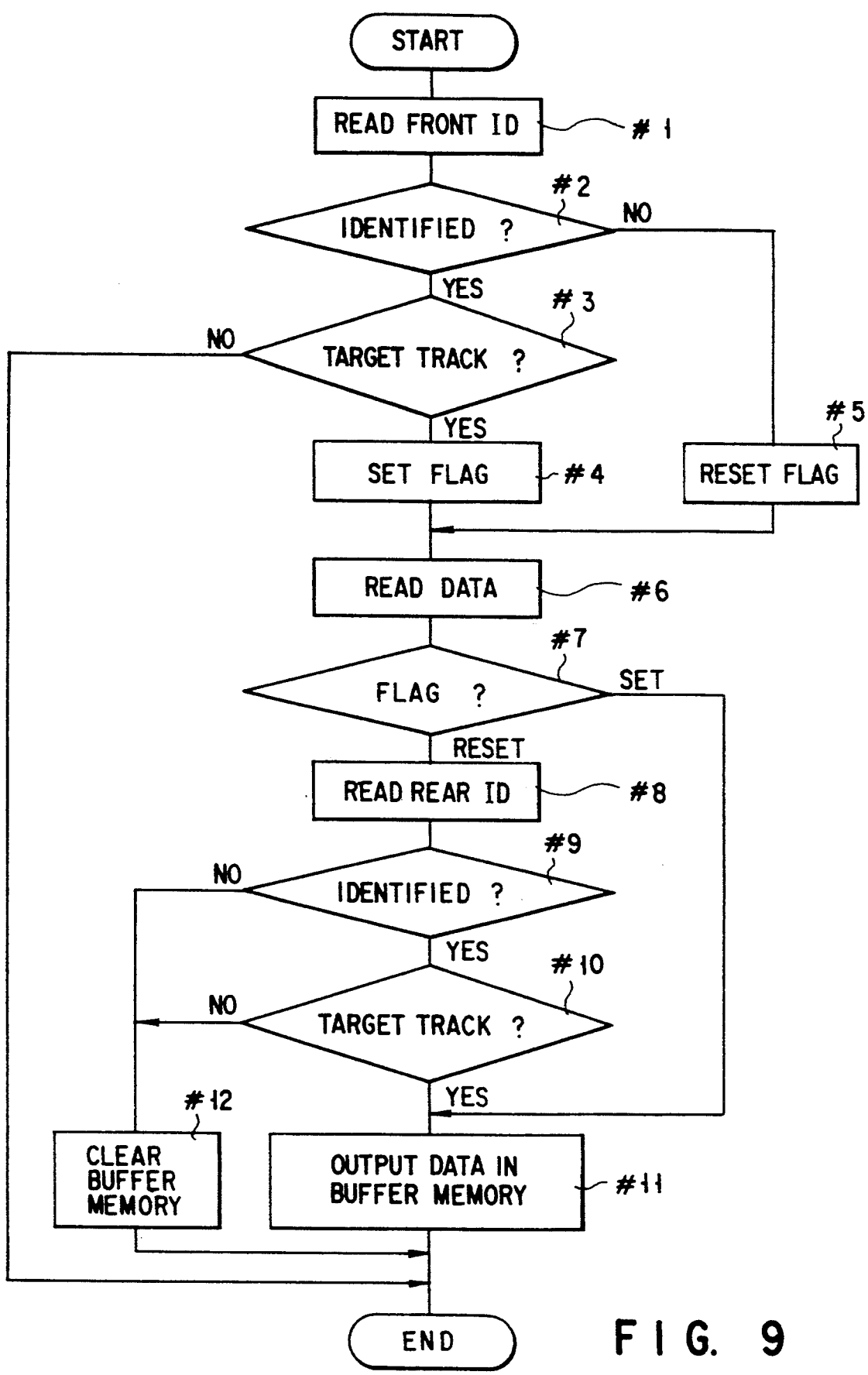
FIG. 9 is a flow chart showing the reproducing operation of the first embodiment.

The data reproducing sequence of the first embodiment shown in FIG. 9 is of a case wherein only either one of the data processing systems for the three tracks shown in FIG. 8 is used. In this case, data can also be reproduced by a conventional single track read type apparatus that reads data in units of tracks. Note that, of the data processing systems shown in FIG. 8, e.g., the circuit of the system including the photodetector element 112b to the buffer memory 122b is used.

When data reproduction of a given target track address is designated by a host computer (not shown), the reproducing light beam moves in accordance with the target address and the front ID portion of the track that the photodetector element 112b currently accesses is read in step #1. The front ID portion means the ID portion 6a on the left side when the optical head 26 is to scan the optical card 16 shown in FIG. 1 from the left to the right, and the ID portion 6b on the right side when the optical head 26 is to scan the optical card 16 from the right to the left. Similarly, a rear ID portion means the ID portion 6b on the right side when the optical head 26 is to scan the optical card 16 from the left to the right, and the ID portion 6a on the left side when the optical head 26 is to scan the optical card 16 from the right to the left.

In step #2, it is determined whether a track address can be identified from the read result of the front ID portion. This determination may be performed in the same manner as that of the conventional method. For example, of five items of ID data included in the front ID portion, if three items or more of ID data can be subjected to error correction and if a coincidence can be obtained among the items of ID data that are subjected to error correction, the coincident track address may be determined as the target track address. More specifically, if three items or more of the ID data (track address) that can be subjected to error correction are the same, this track address is recognized as the address of the track which is currently to be scanned. In another method, the track address may be determined by majority from items of ID data that can be subjected to error correction.

If it is determined in step #2 that the track address of the track which is to be currently scanned can be identified, the flow advances to step #3, and it is determined whether this track address coincides with the address of the target track from which data is to be read. If NO in step #3, it is determined that the seek operation fails, and this scanning is ended. If YES in step #3, the flow advances to step #4 to set a determination flag indicating that the track which is to be currently scanned is determined as the target track. Then, the flow advances to step #6.

If it is determined in step #2 that the track address cannot be identified in the front ID portion (including a case wherein it is determined that the probability of erroneously recognizing a track address is not sufficiently low), the track address of the track which is to be currently scanned is not determined. The flow advances to step #5 to reset the determination flag. Then, the flow advances to step #6.

More specifically, in this embodiment, if the track address cannot be identified in the front ID portion, e.g., of the five items of ID data of the front ID portion, if only one item of ID data can be subjected to error correction and thus the track address can be temporarily identified, but the probability of erroneously recognizing the track address is high to a certain degree and thus the reliability of the readout track address is low, the flow advances to step #6 to execute reading of the data of the data portion 8. In step #6, data of the data portion 8 is read, and demodulated data is stored in the buffer memory 122b. In other words, in this embodiment, only when the track which is being currently accessed can be determined as a track other than the target track, it is determined that the seek operation fails to end the reproducing operation. Otherwise, data is read for the present.

When data read is ended, whether or not the determination flag is set is determined in step #7. If it is set, it means that the current track address has already been determined as the target track address in the front ID portion. Thus, in step #11, the read result of the data of the data portion which is obtained in step #6 is determined as the read result of the target track, and scanning is ended. More specifically, in step #11, the content of the buffer memory 122b is output as the readout data of the target track. Since scanning is performed by reciprocally moving the optical card 16, the data of the data portion 8 is sometimes read by being scanned in the opposite direction to that in writing data. Usually, the data of the data portion 8 is written in a predetermined direction, e.g., from the left to the right in FIG. 1. Thus, the controller 14 reads the data strings of the buffer memory 122b by inverting a direction of time axis in accordance with the read direction. More specifically, the data read during scanning from the right to the left is sequentially output from the buffer memory 122b starting from the bit which is read last.

In step #7, if the determination flag is reset, it means that the track address is not identified in the front ID portion. In this case, data is read from the rear ID portion in step #8. In step #9, it is determined whether a track address can be identified from the read result of the rear ID portion. This identifying method may be performed in the same manner as in reading the data of the front ID portion in step #2.

If NO in step #9, it is determined that the seek operation fails. In step #12, the content of the buffer memory 122b storing the data which has been read in step #6 is cleared, and scanning is ended.

If YES in step #9, the flow advances to step #10, and it is determined whether the identified track address coincides with the target track address in accordance with the same manner as in step #3. If YES in step #10, the flow advances to step #11, the read result of the data of the data portion which has been read in step #6 is output as the read result of the target track, and scanning is ended. If NO in step #10, it is determined that the seek operation fails. In step #12, the content of the buffer memory 122b storing data which is read in step #6 is cleared, and scanning is ended.

In this manner, according to the first embodiment, when identification of the track address by reproducing the ID portion in front of the data portion fails, or when the probability of erroneously recognizing the track address is high, although the track address can be temporarily identified by this front ID portion, the data portion is reproduced regardless of whether the track address is identified. After the data portion is reproduced, the ID portion on the rear side of the data portion is successively reproduced. When the track address can be identified in this rear ID portion, the reproduction result of the data portion is determined to be valid.

Then, the ID portion which is arranged on the rear side of the data portion and which is originally used only during scanning in the opposite direction is effectively used. When the track address cannot be identified by reproducing the ID portion in front of the data portion, this one scanning operation is not entirely invalidated, unlike in the conventional apparatus, but each scanning operation can be effectively used. Therefore, while the probability of reproducing an erroneous data portion due to erroneous track address recognition is suppressed to a low level, each scanning operation during reproduction can be effectively used to eliminate a wasteful scanning operation, thereby increasing the processing efficiency.

Other embodiments of the present invention will be described. In the other embodiments, portions corresponding to those in the first embodiment are denoted by the same reference numerals, and a detailed description thereof will be omitted.

Figure 10:
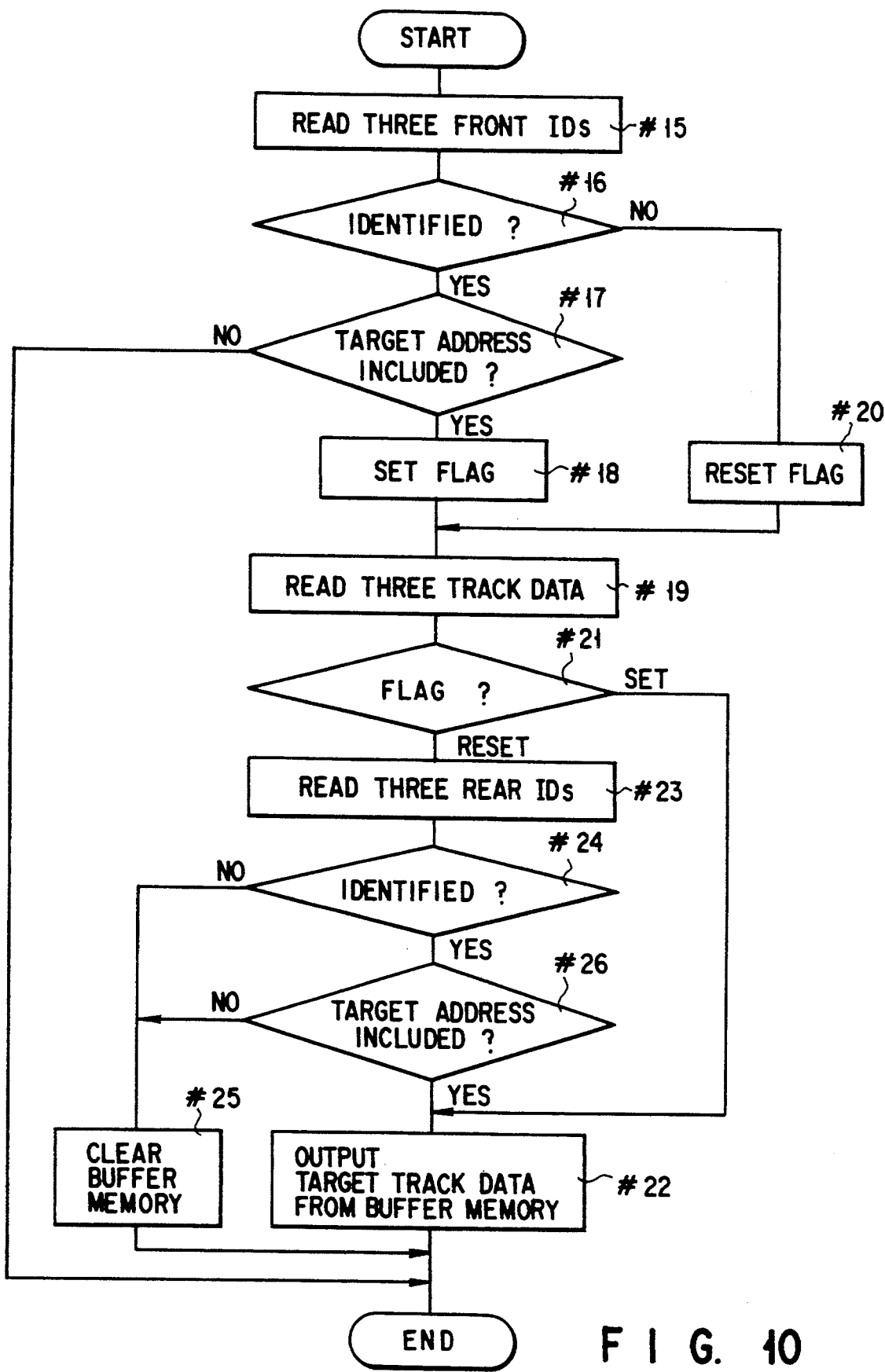
FIG. 10 is a flow chart showing the reproducing operation of a second embodiment.

In the first embodiment, the operation concerning single track reproduction has been described. In the second embodiment, multi-track reproduction will be described. The second embodiment exemplifies a case wherein a plurality of tracks are read simultaneously and, e.g., a circuit for three tracks corresponding to the three systems of the data processor shown in FIG. 8 is used. As the arrangement of the apparatus is the same as that of the first embodiment, a description thereof will be omitted. FIG. 10 is a flow chart showing the data reproducing sequence according to the second embodiment. All the processing operations of FIG. 10 are executed by the controller 14.

In step #15, front ID portions are read. In this case, the front ID portions of three tracks are to be read.

In step #16, it is determined whether the track address can be identified from the read result of the front ID portions. In this identification method, the track address may be identified from all of the fifteen ID data items included in the front ID portions of the three tracks. Alternatively, the track address may be identified not from all the ID data items, but from the read result of some of the ID data items, like a total of six ID data items consisting of two ID data items of the front ID portion of each of three tracks. In this case, if the probability of erroneous track address recognition is sufficiently low and the track address can be identified in accordance with this track address identification method, the flow advances to step #17.

In step #17, it is determined whether either of the track addresses (which are continuous, as a matter of course) of the three tracks identified in step #16 coincides with the target track address. If NO in step #17, it is determined that the seek operation fails, and this scanning is ended.

If YES in step #17, the flow advances to step #18 to set a determination flag. Then, the flow advances to step #19.

If it is determined in step #16 that the track address cannot be identified in the front ID portion or that the probability of erroneous track address recognition is not sufficiently low, the track address of the track which is to be currently scanned is not determined. The flow advances to step #20 to reset the determination flag. Then, the flow advances to step #19.

More specifically, in the second embodiment, even when the track address cannot be identified in the front ID portion, the flow advances to step #19 to read data from a data portion 8. In step #19, the data of the data portion 8 (data of the three tracks) is read, and demodulated data is stored in buffer memories 122b, 122b, and 122c. In other words, in this embodiment, only when neither of the three tracks which are being currently accessed are determined as the target track, it is determined that the seek operation fails to end the reproducing operation. Otherwise, data is temporarily read.

When data read is ended, it is determined whether the determination flag is set in step #21. If it is set, it means that either of the three tracks is determined as the target track in the front ID portion. Thus, in step #22, the read result of the data of the data portion which is obtained in step #19 is determined as the read result of the target track, and scanning is ended. More specifically, in step #22, the corresponding track data is output from the buffer memory as the readout data of the target track. Since scanning is performed by reciprocally moving an optical card 16, the data of the data portion 8 is sometimes read by being scanned in the opposite direction to that in writing data. Usually, the data of the data portion 8 is written in a predetermined direction, e.g., from the left to the right in FIG. 1. The controller 14 reads the content of the buffer memory by inverting the data strings in a direction of time axis in accordance with the read direction. More specifically, the data read during scanning from the right to the left is sequentially output from the buffer memory starting from the bit which is read last.

In step #21, if the determination flag is reset, it means that the track address is not identified in the front ID portions. In this case, data is read from the rear ID portions of the three tracks in step #23. In step #24, the track address is identified from the read result of the rear ID portions. This identifying method may be performed in the same manner as in reading the data of the front ID portions in step #16.

If NO in step #24, it is determined that the seek operation fails. In step #25, the contents of the buffer memories 122a, 122b, and 122c storing the data which have been read in step #19 are cleared, and scanning is ended.

If YES in step #24, the flow advances to step #26, and it is determined whether either of the identified track addresses coincides with the target track address in accordance with the same manner as in step #17. If YES in step #26, the flow advances to step #22, the target track data, of the read result of the data of the data portion read in step #19, is read out from the buffer memory and output as the read result of the target track, and scanning is ended. If NO in step #22, it is determined that the seek operation fails. In step #25, the content of the buffer memory 122b storing data which is read in step #19 is cleared, and scanning is ended.

In this manner, in the second embodiment, in reproduction of a plurality of tracks, when the track address is not identified by reproduction of the ID portions in front of the data portions, the data portions of these tracks are reproduced. Thereafter, the rear ID portions of the data portions are reproduced. If the track address can be identified from the rear ID portions, the reproduction results of the data portions are determined to be valid. Therefore, even when the track address cannot be identified by reproducing the ID portions in front of the data portions, the scanning operations of the plurality of tracks are not entirely invalidated but are effectively utilized, thereby increasing the processing efficiency.

FIG. 11 is a block diagram showing the major portion of a third embodiment. The third embodiment is different from the first embodiment in only the structure of the data processor 12 shown in FIG. 4. Except that, the structure of the third embodiment is the same as that of the first embodiment. A data processor 12 of the third embodiment is different from that of the first embodiment in that it has a cache memory 130, as shown in FIG. 11. As will be described later, the cache memory 130 is a memory for storing track data once read from an optical card while this optical card is loaded. By storing data obtained by scanning the optical card once and the track address of this data in the cache memory 130, upon acceptance of a command for data reproduction from, e.g., a host computer, whether the data of the target track requested by this command is present in the data of this cache memory 130 is checked. If it is present, scanning is not performed, and corresponding data, of the stored data, can be transferred to the host computer from the cache memory 130. Then, as the result of the seek operation, even if a track other than the target track is erroneously accessed, data which is read without an error is prevented from being wasted and can be used afterwards. Therefore, the accessing efficiency can be increased, and occurrence of a wasteful scanning operation can be suppressed.

Figure 12:
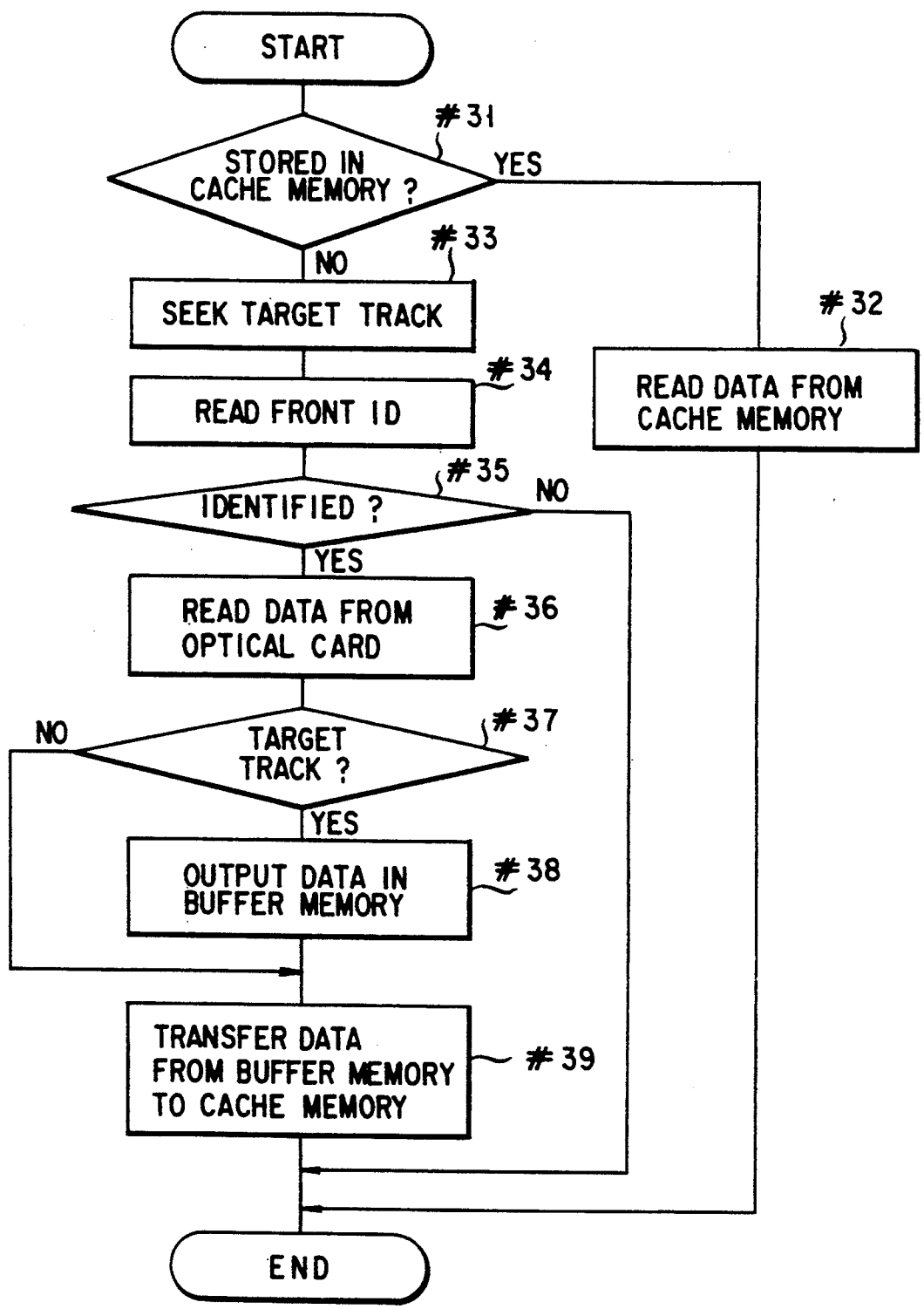
FIG. 12 is a flow chart showing the reproducing operation of the third embodiment.

FIG. 12 is the flow chart showing the data reproducing sequence of the third embodiment. The control operation based on this flow chart is performed by the controller 14, in the same manner as in the embodiments described above. FIG. 12 shows a case wherein, of the data reproducing circuits of the three tracks shown in FIG. 11, only one system (photodetector element 112$b$ to buffer memory 122$b$ in this case) is used. That is, a single track read type apparatus that reads data in units of tracks, as in the conventional apparatus, can be realized.

In the flow charts of FIGS. 9 and 10, the reproducing operation is started after the seek operation is ended. However, in the flow chart of FIG. 12, the reproducing operation is started upon reception of a target address. Although not shown in the flow chart, the cache memory 130 is cleared each time the optical card is loaded on the conveyor table 22.

Upon reception of a target address, in step #31, it is determined whether the data of the target track is stored in the cache memory 130. If YES in step #31, the optical card is not scanned, but the target track data is read out from this memory 130 in step #32, and the readout data is transferred to the host computer or the like as the reproduction result.

If NO in step #31, an operation for seeking the target track is performed in step #33. In step #34, the front ID portion of the track which is currently being accessed by the photodetector element 112$b$ is read. In step #35, it is determined whether the track address can be identified from the read result of the front ID portion. This determination may be performed in the same manner as that of the conventional method. For example, of five items of ID data included in the front ID portion, if three items or more of the ID data can be subjected to error correction and if a coincidence can be obtained among the track addresses of the ID data that are subjected to error correction, the coincident track address may be determined as the target track address. In another method, the track address may be determined by the majority from the track addresses of the ID data that can be subjected to error correction. If the track address cannot be identified, the operation is ended.

If it is determined that the track address of the track which is to be currently scanned is identified, data is read from the data portion 8 in step #36 regardless of whether the identified track is the target track. The readout data is demodulated, and the demodulated data is stored in the buffer memory 122$b$. In step #37, it is determined whether the accessed track is the target track. If YES, the data in the buffer memory 122$b$ is output as the track data, and the flow advances to step #39. If NO, step #38 is omitted, and the flow directly advances to step #39.

In step #39, the data in the buffer memory 122$b$ is transferred to the cache memory 130 together with the track address.

As described above, according to the third embodiment, the track address and data that are read from the track which is scanned once are stored in the cache memory 130 as far as the given optical card is loaded. When the data of this track need be read afterwards, this data can be read from the cache memory 130 without accessing the optical card. Therefore, even when the target track cannot be accessed as the result of the seek operation, this scanning is not wasted, and data can be read at a high speed.

Figure 13:
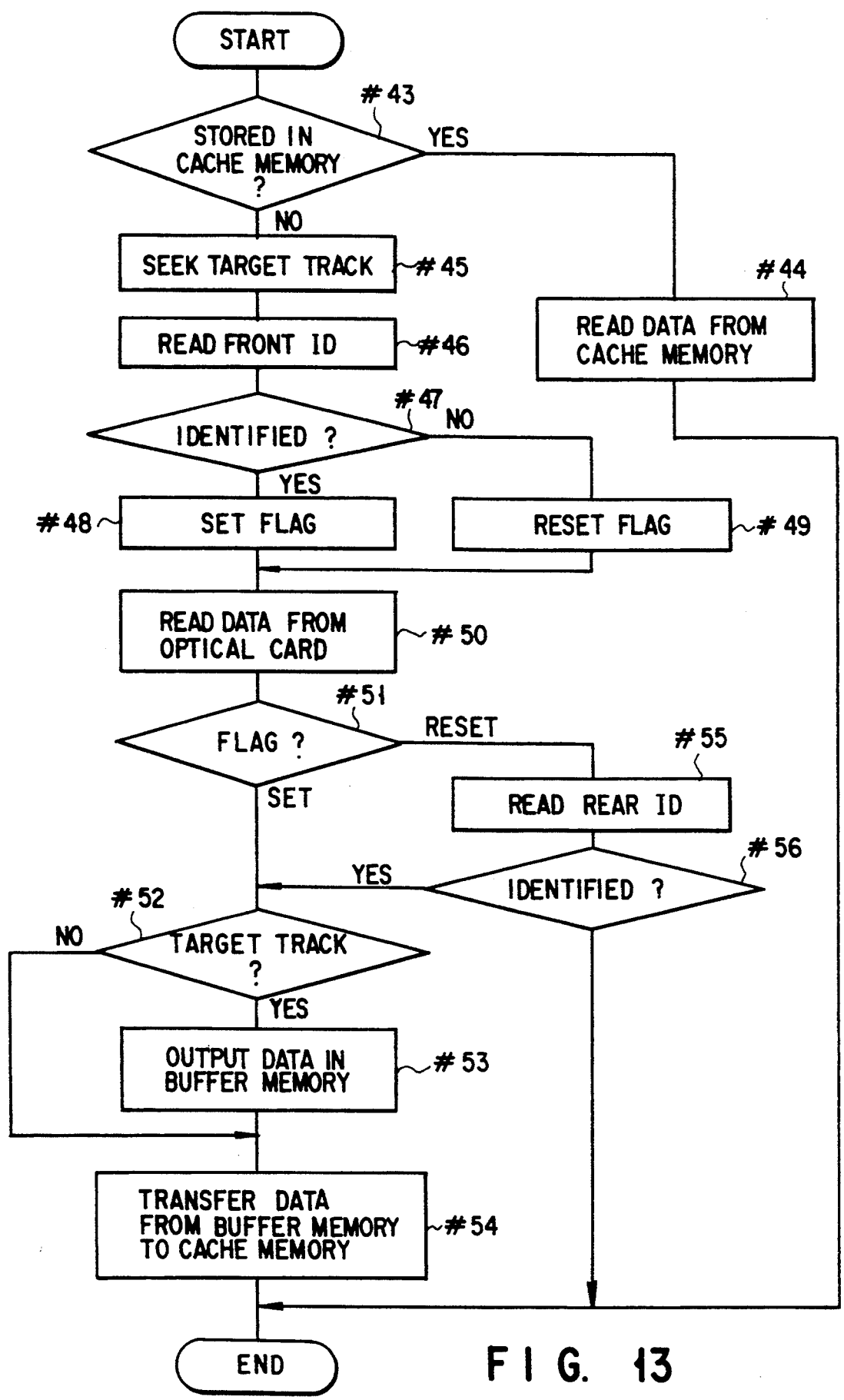
FIG. 13 is a flow chart showing the reproducing operation of a fourth embodiment.

FIG. 13 is a flow chart showing the reproducing operation of the fourth embodiment. The arrangement of the fourth embodiment is the same as that of the third embodiment. In the flow chart of FIG. 13, the reproducing operation is started upon reception of a target address, which is the same as in the third embodiment. Every time an optical card is loaded on the conveyor table 22, the cache memory 130 is cleared.

Upon reception of a target address, in step #43, it is determined whether the data of the target track is stored in a cache memory 130. If YES in step #43, the optical card is not scanned, but the target track data is read out from this memory 130 in step #44, and the readout data is transferred to the host computer or the like as the reproduction result.

If NO in step #43, an operation for seeking the target track is performed in step #45. In step #46, the front ID portion of the track which is being currently accessed by a photodetector element 112$b$ is read. In step #47, it is determined whether the track address can be identified from the read result of the front ID portion. If YES in step #47, a determination flag is set in step #48, and the flow advances to step #50.

If NO in step #47, the determination flag is reset in step #49, and the flow advances to step #50. More specifically, in the fourth embodiment, the data of a data portion 8 is read regardless of whether the track address can be identified from the read result of the front ID portion. The readout data is demodulated, and the demodulated data is stored in the buffer memory 122$b$.

When data read is ended, it is determined whether the determination flag is set in step #51. If YES in step #51, it means that the current track address has been already identified in the front ID portion. Therefore, in step #52, it is determined whether the current track coincides with the target track. If YES in step #52, the content of the buffer memory 122b is output in step #53 as the readout data of the target track. Thereafter, in step #54, the data of the buffer memory 122b is transferred to the cache memory 130 together with the track address.

If the determination flag is reset in step #51, it means that the current track address has not yet been identified in the front ID portion. Therefore, in step #55, the rear ID portion of the track which is being currently accessed by the photodetector element 112b is read. In step #56, it is determined whether the track address can be identified from the read result of the rear ID portion. If YES, the flow advances to step #52 to determine whether the identified track address coincides with the target track. If the track address cannot be identified even from the read result of the rear ID portion, the operation is ended.

As described above, according to the fourth embodiment, the track address and data that are read from the track which is scanned once are stored in the cache memory 130 as far as the given optical card is loaded. When the data of this track need be read afterwards, this data can be read out from the cache memory 130 without accessing the optical card. Therefore, even when the target track cannot be accessed as the result of the seek operation, this scanning is not wasted, and data can be read at a high speed. Furthermore, when the track address cannot be identified only from the front ID portion, the rear ID portion is also utilized to eliminate a wasteful scanning operation, thereby further increasing the processing efficiency.

As has been described above, according to the present invention, each scanning operation for the optical card during reproduction of the optical card is effectively utilized to eliminate a wasteful scanning operation, so that the processing efficiency can be increased.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the third and fourth embodiments, all the readout data are stored in the cache memory 130. However, the readout data may be stored only when the data is read out from a track other than the target track. More specifically, after step #38 in FIG. 12 (when YES in step #37), step #39 may not be executed but the flow may be ended, or after step #53 in FIG. 13 (when YES in step #52), step #54 may not be executed but the flow may be ended. Also, in the first and second embodiments, a cache memory may be provided to store data once read from the optical data or data read out from a track other than the target track.

The above embodiments exemplify an optical card reproducing apparatus capable of performing multi-track reproduction. However, the present invention can similarly be applied to a single track reproducing apparatus. The recording medium is not limited to an optical card, but can be an optical disk, a magneto-optical disk, a magnetic card, a magnetic disk, or the like.

What is claimed is:

1. An apparatus for reproducing data from an optical data recording medium, the apparatus comprising:
   memory means for storing data read from the optical data recording medium together with an address of the read data;
   first determining means for determining whether data at a target address which is to be reproduced is stored in said memory means;
   first reading means for, when said first determining means determines that the data is stored in said memory means, reading data from said memory means; and
   second reading means for, when said first determining means determines that the data is not stored in said memory means, accessing the target address of the optical data recording medium to read data;
   wherein said second reading means comprises:
      a buffer memory for storing data read from a given recording address;
      second determining means for determining whether an access address currently being accessed is the target address;
      means for, when said second determining means determines that the access address is the target address, outputting a content of said buffer memory and writing the content of said buffer memory in said memory means; and
      means for, when said second determining means determines that the access address is not the target address, writing the content of said buffer memory in said memory means.

2. An apparatus for reproducing data from an optical data recording medium, the apparatus comprising:
   memory means for storing data read from the optical data recording medium together with an address of the read data;
   first determining means for determining whether data at a target address which is to be reproduced is stored in said memory means;
   first reading means for, when said first determining means determines that the data is stored in said memory means, reading data from said memory means; and
   second reading means for, when said first determining means determines that the data is not stored in said memory means, accessing the target address of the optical data recording medium to read data, wherein said second reading means comprises:
      a buffer memory for storing data read from a given recording address;
      second determining means for determining whether an access address currently being accessed is the target address;
      means for, when said second determining means determines that the access address is the target address, outputting a content of said buffer memory; and
      means for, when said second determining means determines that the access address is not the target address, writing the content of said buffer memory in said memory means.

3. An apparatus according to claim 1, wherein:
   said optical data recording medium includes a large number of parallel linear data recording tracks formed on a card-like substrate and each track having one address, a data area at a central portion thereof, and two identification areas at two ends thereof; and said second determining means determines the access address on the basis of the recording address read from either of said two identification areas.

4. An apparatus according to claim 3, wherein:

said optical data recording medium includes a large number of parallel linear data recording tracks formed on a card-like substrate and each track having one address, a data area at a central portion thereof, and two identification areas at two ends thereof; and said second determining means determines the access address on the basis of the recording address read from either of said two identification areas.

5. An apparatus according to claim 3, wherein:

each of said two identification areas comprises a plurality of identification portions for storing a same address; and said second determining means determines, when at least a predetermined number of addresses of addresses read from said plurality of identification portions coincide, the coincident address as the access address.

6. An apparatus according to claim 4, wherein:

each of said two identification areas comprises a plurality of identification portions for storing a same address; and said second determining means determines, when at least a predetermined number of addresses of addresses read from said plurality of identification portions coincide, the coincident address as the access address.

7. An apparatus according to claim 5, wherein each of said plurality of identification portions stores an address which is subjected to error correction encoding.

8. An apparatus according to claim 6, wherein each of said plurality of identification portions stores an address which is subjected to error correction encoding.

9. An apparatus according to claim 1, wherein:

said optical data recording medium includes a large number of parallel linear data recording tracks formed on a card-like substrate and each track having one address; and a content of said memory means is cleared every time the optical data recording medium is replaced in the data reproducing apparatus.

10. An apparatus according to claim 1, wherein:

said optical data recording medium includes a large number of parallel linear data recording tracks formed on a card-like substrate and each track having one address; and said second reading means accesses a plurality of tracks simultaneously.

11. An apparatus according to claim 3, wherein said second reading means comprises:

actuator means for moving a read head and the recording medium relative to each other in a direction perpendicular to said tracks; and means for driving said actuator means when said first determining means determines that the data is not stored in said memory means.

12. An apparatus according to claim 3, wherein said second reading means comprises actuator means for moving a read head and the recording medium relative to each other in a direction of said tracks, and for causing said read head to sequentially access one of said two identification areas, said data area, and another of said two identification areas.

13. An apparatus for reproducing data from an optical data recording medium having a large number of parallel linear recording tracks, each of said tracks having a data recording area and two address recording areas for recording an address thereof at two ends of the data recording area, the apparatus comprising:

first reading means for continuously accessing one of said two address recording areas and said data recording area;

first determining means for determining whether an address can be identified from data read from said one of said two address recording areas;

second determining means for, when said first determining means can identify the address, determining whether the identified address is a target address which is to be reproduced;

a buffer memory for storing data read from said data recording area;

means for, when said second determining means determines that the identified address is the target address, outputting a content of said buffer memory;

second reading means for, when said first determining means cannot identify the address or said second determining means determines that the identified address is not the target address, accessing the other of said two address recording areas after said first reading means performs an access operation;

third determining means for determining whether or not an address can be identified from data read from said other of said two address recording areas;

fourth determining means for, when said third determining means can identify the address, determining whether the identified address is the target address;

means for, when said fourth determining means determines that the identified address is the target address, outputting a content of said buffer memory; and means for, when said third determining means cannot identify the address or said fourth determining means determines that the identified address is not the target address, clearing the content of said buffer memory.

14. An apparatus for reproducing data from an optical data recording medium having a large number of parallel linear recording tracks, each of said tracks having a data recording area and two address recording areas for recording an address thereof at two ends of the data recording area, the apparatus comprising:

first reading means for continuously accessing one of said two address recording areas and said data recording area of a plurality of tracks;

first determining means for determining whether addresses can be identified from data read from said one of said two address recording areas;

second determining means for, when said first determining means can identify the addresses, determining whether the identified addresses include a target address which is to be reproduced;

a buffer memory for storing data read from said data recording area;

means for, when said second determining means determines that the identified addresses includes the target address, outputting data of the target address from said buffer memory;

second reading means for, when said first determining means cannot identify the addresses or said second determining means determines that the identified addresses do not include the target address, accessing the other of said two address recording areas of each of said plurality of tracks after said first reading means performs an access operation;

third determining means for determining whether addresses can be identified from data read from said other of said two address recording areas;

fourth determining means for, when said third determining means can identify the addresses, determining whether the identified addresses include the target address;

means for, when said fourth determining means determines that the identified addresses include the target address, outputting data of the target address from said buffer memory; and means for, when said third determining means cannot identify the addresses or said fourth determining means determines that the identified addresses do not include the target address, clearing a content of said buffer memory.

15. An apparatus according to claim 2, wherein:

said optical data recording medium includes a large number of parallel linear data recording tracks formed on a card-like substrate and each track having one address; and a content of said memory means is cleared every time the optical data recording medium is replaced in the data reproducing apparatus.

16. An apparatus according to claim 2, wherein:

said optical data recording medium includes a large number of parallel linear data recording tracks formed on a card-like substrate and each track having one address; and said second reading means accesses a plurality of tracks simultaneously.

* * * * *